United States Patent [19]

Bruton

[11] Patent Number: 4,986,569

[45] Date of Patent: Jan. 22, 1991

[54] AIRBAG ATTACHMENT SYSTEM

[75] Inventor: William J. Bruton, Bellevue, Wash.

[73] Assignee: Automotive Systems Laboratory, Inc., Farmington Hills, Mich.

[21] Appl. No.: 367,789

[22] Filed: Jun. 19, 1989

[51] Int. Cl.$^5$ .............................................. B60R 21/06
[52] U.S. Cl. ..................................... 280/743; 280/741
[58] Field of Search ............... 280/728, 741, 742, 743, 280/730, 731, 734, 739

[56] References Cited

U.S. PATENT DOCUMENTS 3,810,654  5/1974  DeBano, Jr. et al. ............... 280/743
4,111,457  9/1978  Kob et al. ............................ 280/743
4,286,954  9/1981  McArthur et al. .................. 280/743

FOREIGN PATENT DOCUMENTS 160756  6/1989  Japan .................................... 280/743

Primary Examiner—Richard A. Bertsch
Attorney, Agent, or Firm—Lyon & Delevie

[57] ABSTRACT

An airbag attachment system for an inflatable vehicle occupant restraint system comprises a cannister having a shoulder on a peripheral edge flange for seating of a metal rod disposed in a channel in the airbag. The edge flange of the cannister is reentrantly folded about the rod to retain the airbag on the cannister.

1 Claim, 1 Drawing Sheet

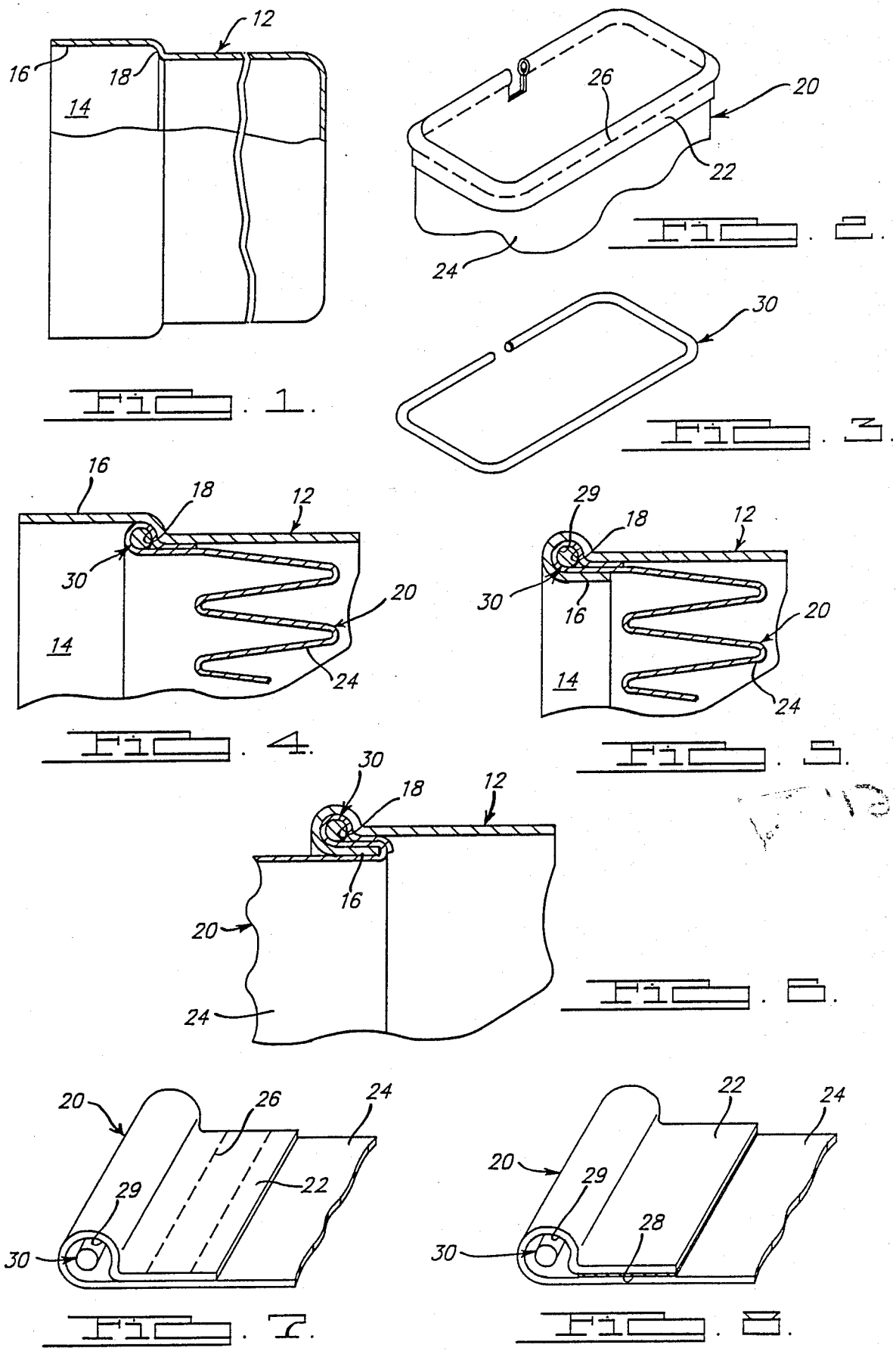

AIRBAG ATTACHMENT SYSTEM

BACKGROUND OF THE INVENTION

A solution to the problem of attaching a fabric airbag to the cannister of the inflator system is critical to development of an economical, practical and production-orientated inflatable vehicle passenger restraint system. Existing systems utilize a metal retaining ring that is riveted or bolted to the cannister so as to merely pinch the airbag therebetween. Such retaining rings are prone to leakage and exhibit a significant weight and cost penalty.

SUMMARY OF THE INVENTION

The present invention relates to attachment of the airbag fabric directly to the metal inflator cannister by means of structure and a method of manufacture that assures a continuous seal, minimizes the number of components used in manufacture, and is suitable to high-volume manufacturing processes.

Specifically, the attachment method consists of reentrantly folding the edge of the metal inflator cannister around a beaded edge of the airbag fabric. The beaded edge consists of a locking rod disposed within a peripheral channel on the edge of the fabric bag. The channel is formed by reentrantly folding the fabric and stitching or bonding the reentrantly folded portion. The rod is of metal and is preformed to the profile of the open end of the cannister. The rod may be sewn into the fabric directly or may be installed in the channel after the seam is sewn by leaving a gap in the seam and threading the rod through the seam.

BRIEF DESCRIPTION OF THE DRAWINGS

FIG. 1 is a fragmentary cross section of an inflator cannister prior to assembly with an airbag;

FIG. 2 is a view of the airbag prior to assembly of the locking rod therein;

FIG. 3 is view of the locking rod;

FIG. 4 is a view similar to FIG. 1 of the assembled bag and rod prior to folding of the edge flange of the cannister about the airbag;

FIG. 5 is a view similar to FIG. 4 after folding of the edge portion of the metal cannister;

FIG. 6 is a view similar to FIG. 5 after deployment of the airbag;

FIG. 7 is a view of one method of forming the rod accepting channel in the airbag; and FIG. 8 is a view of an alternate method of forming the channel in the airbag.

DETAILED DESCRIPTION OF THE PREFERRED EMBODIMENT OF THE INVENTION

As seen in FIG. 1 an airbag attachment system for an inflatable vehicle occupant restraint system comprises a rectangular cannister 12 having an open end 14 defined by a peripheral flange 16. The flange 16 extends inwardly of the cannister 12 terminating in a laterally extending shoulder 18.

As seen in FIGS. 2, 7 and 8, an airbag 20 has a reentrantly folded edge portion 22 that is secured to a body portion 24 thereof as by stitching 26 or adhesive bonding 28, to form a rod accepting channel 26 therein.

As seen in FIG. 3, a steel rod 30 is formed to a rectangular configuration complementary to the shoulder 18 on the flange 16 of the cannister 12 so as to be capable of being seated thereon. After assembly of the airbag 20 and rod 30 onto the shoulder 18 of cannister 12, the peripheral flange 16 of the cannister 12 is folded about the airbag 20 entrapping rod 30 to lock the airbag 20 into the cannister 12.

As seen in FIG. 5, the airbag 20 is expanded outwardly of the cannister 12 causing the fabric thereof to fold back over the flange 16 placing the principal shock loading on the flange 16 in compression and thereby loading the side walls of the cannister 12 in tension. The aforesaid relationship of components maximizes the structural integrity of the system as well as minimizing complexity and manufacturing cost thereof.

While the preferred embodiment of the invention has been disclosed, it should be appreciated that the invention is susceptible of modification without departing from the scope of the following claims.

I claim:

1. An airbag attachment system for an inflatable vehicle occupant restraint system comprising
   a cannister having an open end defined by spaced sidewalls,
   a peripheral edge flange on said cannister having a shoulder extending generally normally and laterally outwardly relative to the sidewalls thereof,
   an inflatable airbag disposed within said cannister and having an open end with a channel thereabout, and
   a metal rod disposed in the channel of said airbag and seated on the shoulders of said cannister, the edge flange of said cannister being reentrantly directed toward the interior of said cannister so as to envelop said rod and the channel portion of said airbag so as to retain said rod and airbag on the shoulder of said cannister whereby the inflatable airbag is reentrantly directed about the end of the edge flange of said cannister upon inflation of said airbag and deployment thereof outwardly of the open end of said cannister.

* * * * *